United States Patent
Flynn

(10) Patent No.: US 6,527,121 B1
(45) Date of Patent: Mar. 4, 2003

(54) DISPLAY PACKAGING FOR FRUITS OR VEGETABLES

(75) Inventor: Emmett M. Flynn, Brantford (CA)

(73) Assignee: Flynn Produce Ltd., Mississauga ( * ) Notice: Subject to any disclaimer, the term of this patent is extended or adjusted under 35 U.S.C. 154(b) by 0 days.

(21) Appl. No.: 09/533,692

(22) Filed: Mar. 23, 2000

(51) Int. Cl.[7] .............................................. B65D 75/00
(52) U.S. Cl. ...................... 206/497; 206/499; 206/770
(58) Field of Search .............................. 206/497, 499, 206/507, 557, 521.1, 770, 771, 776; 426/124, 396, 415, 419

(56) References Cited

U.S. PATENT DOCUMENTS

| 3,511,288 | A |   | 5/1970 | Swett et al. |
|---|---|---|---|---|
| 4,498,588 | A |   | 2/1985 | Scott |
| 4,515,266 | A |   | 5/1985 | Myers |
| 4,622,229 | A |   | 11/1986 | Toshitsugu |
| 4,769,262 | A |   | 9/1988 | Ferrar et al. |
| 4,886,372 | A |   | 12/1989 | Greengrass et al. |
| 4,958,479 | A |   | 9/1990 | Treiber |
| 5,171,593 | A |   | 12/1992 | Doyle |
| 5,226,531 | A |   | 7/1993 | Garwood |
| 5,409,105 | A | * | 4/1995 | Appelbaum et al. ........ 206/776 |
| 5,492,703 | A |   | 2/1996 | Gics |
| 5,518,119 | A | * | 5/1996 | Takahashi ................... 206/497 |
| 5,711,978 | A |   | 1/1998 | Breen et al. |
| 5,744,181 | A |   | 4/1998 | Sornay et al. |
| 5,811,142 | A | * | 9/1998 | DelDuca et al. ............ 426/396 |
| 5,820,908 | A |   | 10/1998 | Li |
| 5,897,901 | A |   | 4/1999 | Visioli |
| 5,953,886 | A |   | 9/1999 | Eppler |
| 6,234,308 | B1 | * | 5/2001 | Saffron et al. .............. 206/776 |

* cited by examiner

Primary Examiner—Luan K. Bui
(74) Attorney, Agent, or Firm—Bereskin & Parr

(57) ABSTRACT

This invention discloses a method and apparatus for packaging fruits or vegetables. The package comprises a reusable plastic food container, a lid for such container, and a layer of breathable transparent film. The container is placed on top of the lid, the fruits or vegetables are placed in the container, the assembly is wrapped with the transparent film, such that the edges overlap underneath the lid, and the overlapping edges of the film are heat sealed together. Once the package is unwrapped and the contents are used, the container can be used to store leftovers or other food products in a refrigerator, etc. The clear breathable transparent film allows prospective customers to clearly view the product inside. The film also allows ethylene and other gases emitted from the fruits or vegetables contained therein to escape, thereby maintaining freshness.

9 Claims, 2 Drawing Sheets

DISPLAY PACKAGING FOR FRUITS OR VEGETABLES

FIELD OF THE INVENTION

This invention relates to packaging of food products, and in particular, to display packages for fresh fruits and vegetables.

BACKGROUND OF THE INVENTION

There is a need to display fresh fruits and vegetables in packaging which make them attractive to prospective consumers in a market setting. There is also a need to protect fresh fruits and vegetables from excess handling which can cause bruising and spoilage leading to short shelf-life.

Fresh fruits and vegetables such as cherry tomatoes, blueberries and apricots are typically packaged in one-pint plastic clamshell containers, or in plastic wire mesh or cardboard baskets. These prior art containers reduce the amount of human handling, and allow for visual inspection of the contents. However, such containers are typically discarded once the contents has been consumed, which is wasteful.

There is accordingly a need for a more ecologically friendly mode of packaging fresh fruits and vegetables for display.

SUMMARY OF THE INVENTION

The subject invention is directed to a display package, comprising a reusable food storage container placed on top of a lid for the container, and a sheet of transparent, flexible, breathable material overwrapping and securing together the container and the lid, wherein once the sheet is removed, the container and the lid may be used together to form an airtight enclosure for storing various food products.

One aspect of the invention is a display package for fruits and vegetables, comprising a container suitable for reuse as a fruit storage container, the container having an open top and a capacity selected to contain a predetermined amount of fruits or vegetables, a lid for the container, the container being positioned on top of the lid, the lid being shaped to be capable of releasably sealably enclosing the top of the container, thereby providing an airtight enclosure for storing various food products, once the fruits or vegetables are removed from the container, and a sheet of flexible material sized for overwrapping the container and the lid such edge portions of the sheet overlap underneath the lid, the edge portions being coupled together so as to secure the lid against the container during handling and display, the material having a composition which allows for visual inspection of the fruits or vegetables and escape of gases generated by the fruits or vegetables.

The sheet of material is preferably a clear breathable PVC film. The overlapping ends of the film are preferably heat sealed. The container and lid are preferably commercially available reusable food storage containers.

The subject invention also relates to a method for packaging fruits or vegetables, comprising the steps of:

(a) placing the fruits or vegetables in a container suitable for use as a food storage container;
(b) placing the container on the top of a reusable lid for the container;
(c) overwrapping the container and the lid with a sheet of flexible material sized to extend under and cover the bottom of the lid, the material being suitable to display the fruits or vegetables and to allow gases generated thereby to escape from the containers;
(d) folding the film underneath the lid such that edge portions of the film overlap; and
(e) coupling the overlapping portions of the film together so as to secure the lid against the container during handling and display.

BRIEF DESCRIPTION OF THE DRAWINGS

For a better understanding of the present invention, and to show more clearly how it may be carried out in practice, reference will now be made, by way of example, to the accompanying drawings, in which.

DETAILED DESCRIPTION OF THE PREFERRED EMBODIMENT

Figure 1:
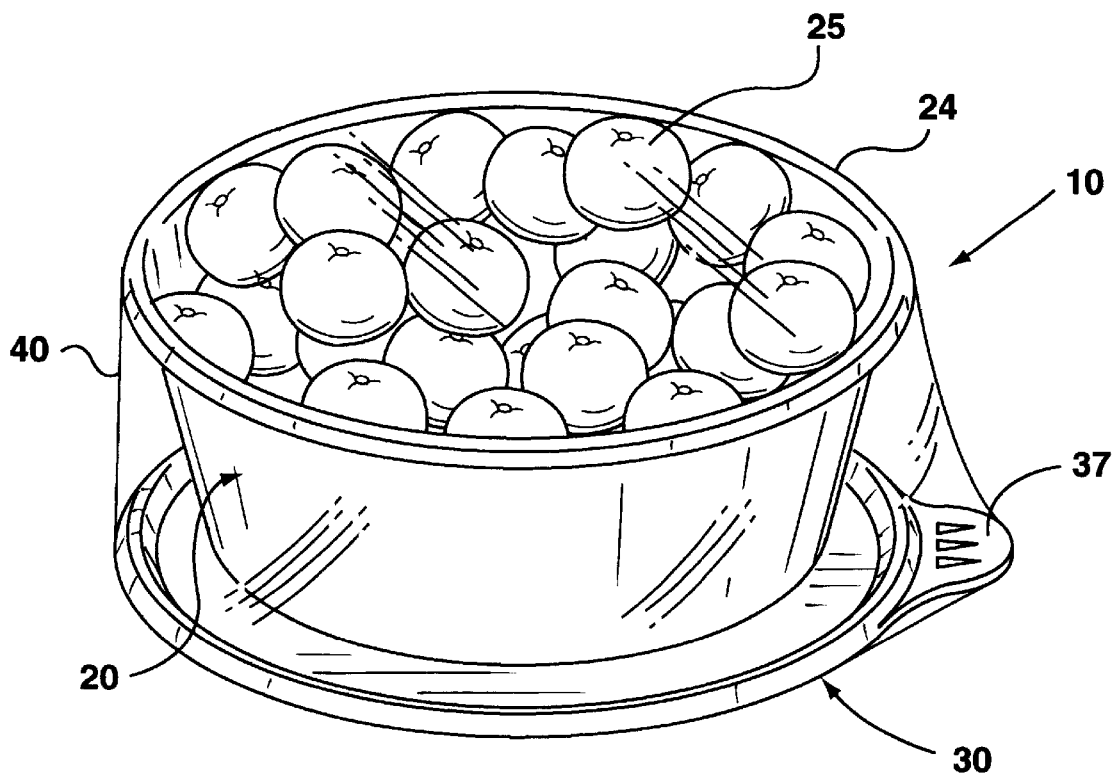
FIG. 1 is a perspective view of a display package made in accordance with a preferred embodiment of the invention.
Figure 2:
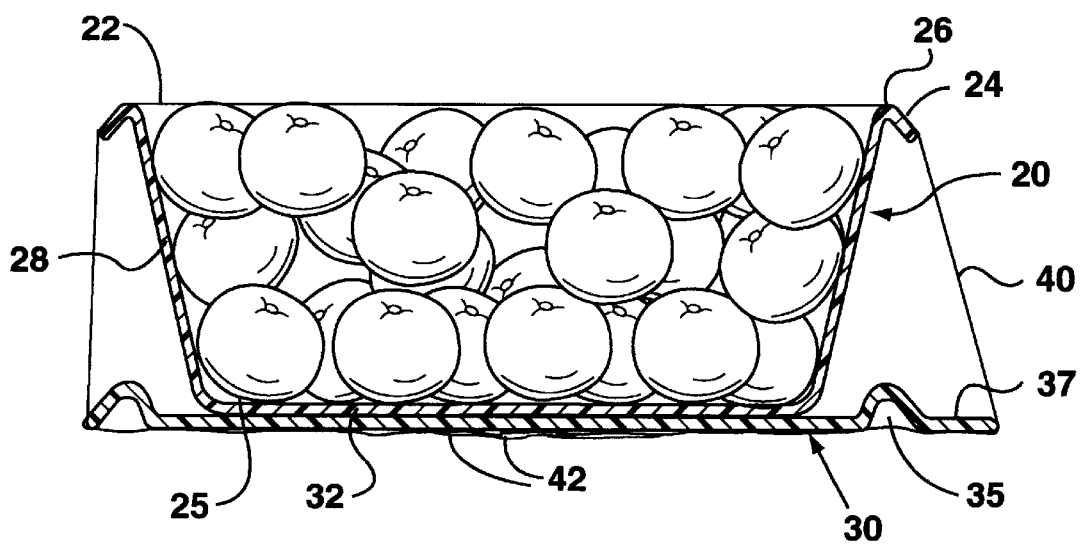
FIG. 2 is a cross-sectional view of the subject display package.

Referring to FIGS. 1 and 2, illustrated therein is a display package 10 made in accordance with a preferred embodiment of the invention. Package 10 comprises a plastic container 20 for holding fruits or vegetables 25 such as cherry tomatoes, a lid 30 positioned underneath the container 20, and a sheet of clear plastic film 40 for overwrapping and securing together container 20 and lid 30.

As best shown in FIG. 2, container 20 has an open top 22 defined by rim 24 having a circumferential ridge 26, side walls 28 and closed bottom 32. Container 20 is selected to have a capacity for containing a predetermined amount of fruits or vegetables, typically one pint in the case of cherry tomatoes 25.

Lid 30 is shaped to releasably enclose top 22 of container 20. Lid 30 comprises a circumferential groove 35 sized to fit over ridge 26 of container 20, so as to provide an airtight seal between lid 30 and container 20. Lid 30 also includes handle 37 which assists a use in removing lid 30 from container 20.

Container 20 and lid 30 are preferably commercially available reusable plastic food storage containers and lids, such as those made by ZIPLOK, GLADWARE or TUPPERWARE. When lid 30 is placed on container 20, an airtight enclosure is created, which is suitable for storage of leftovers or other food products. Container 20 and lid 30 are preferably made of a microwave-safe plastic material.

Sheet of plastic film 40 is sized to fit over container 20 and lid 30 and to extend under and completely cover the bottom of the lid such that the edge portions 42 of film 40 overlap. Edge portions 42 are then heat sealed, such that the film secures lid 30 and container 20 together during handling and display. Alternatively, the edge portions of film 40 could be gathered together and secured by a suitable closure.

Plastic film 40 is made of a clear material which enables consumers to view the contents of package 10 when it is on display in a fruit market or a supermarket. Film 40 is preferably a PVC (polyvinyl chloride) or other breathable film, which allows ethylene and other gases generated by cherry tomatoes or other fruits or vegetables to escape from container 20. Film 40 also inhibits bacteria from entering container 20, thereby slowing down the decay process. Alternatively, the film could be made of other plastic material having a high rate of gas permeability, or the film could be a non-breathable plastic film having perforations.

Figure 3A:
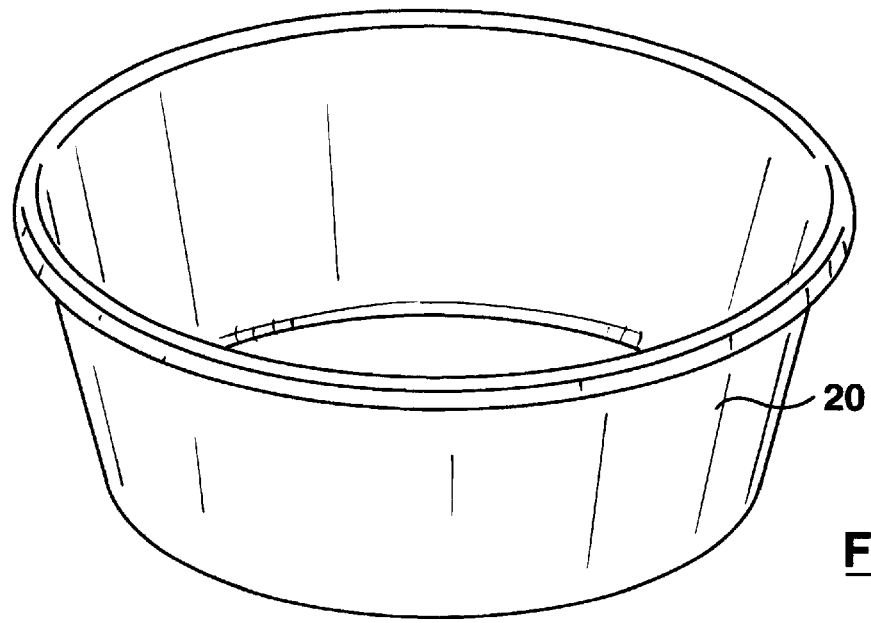
FIG. 3A is a perspective view of the container component of the package shown in FIG. 1.
Figure 3B:
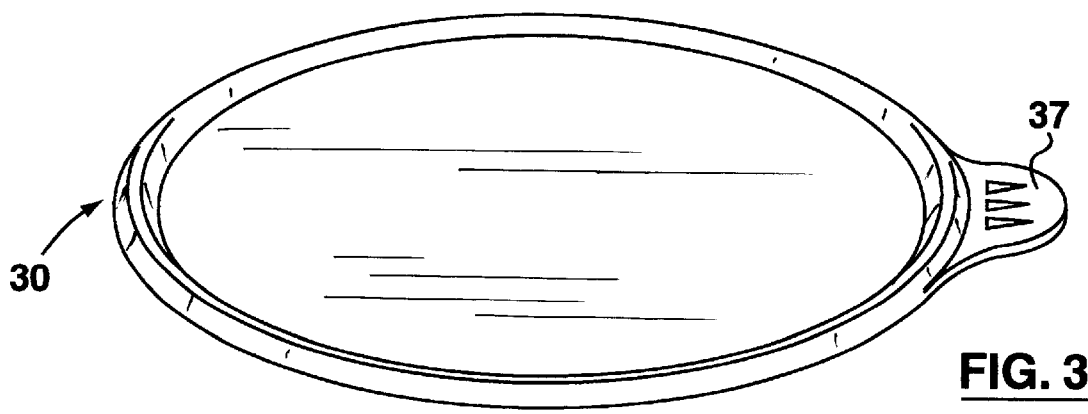
FIG. 3B is a perspective view of the lid component of the subject package.
Figure 4:
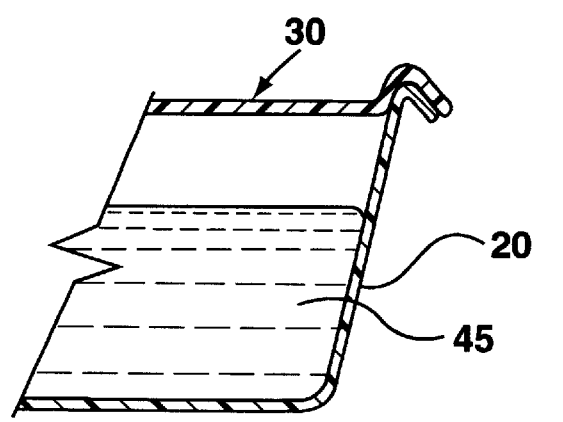
FIG. 4 a partial cross-sectional view showing the lid enclosing the container.

Referring now to FIGS. 3A, 3B and 4, once display package 10 is purchased by a consumer, and film 40 and fruits or vegetables 25 are removed, container 20 can be used together with lid 30 to store leftovers or the like, instead of being thrown away. Leftovers or other food products 45 can be stored in a conventional fashion, by placing them in container 20, and positioning lid 30 in place on container 20, by snapping ridge 26 of container 20 into groove 35 of lid 30.

Display package 10 is preferably assembled using a package wrapping machine. After container 20 is hand-loaded with fruits or vegetables, filled container 20 is placed on top of lid 30 on a conveyor belt, which moves the filled container/lid sub-assembly into an elevator station. An elevator then pushes this sub-assembly up into a film web, thereby stretching the film over the sides of the container and the lid. The film is then folded underneath lid 30 by movable underfolders, and the film is cut to size by knives, such that the edges of film 40 overlap underneath lid 30. The assembly is then placed on a hotplate, where the overlapping edge portions 42 of film 40 are heat sealed together. Alternatively, display package 10 could be hand assembled.

While the material used to overwrap and secure the container to the lid is preferably a plastic film, it could comprise a plastic mesh bag secured by a bread clip or wire clip. Also, while the drawings depict a round food storage container suitable for holding about a pint of cherry tomatoes, the container could be larger or smaller, and it need not be round. For example, the container could be a larger container sized to hold two pounds of kiwi fruit, or a square plastic sandwich container sized to hold a twin pack of tomatoes.

It should therefore be apparent to persons skilled in the art that various modifications and adaptations of the preferred embodiments described herein are possible without departure from the present invention, the scope of which is defined in the appended claims.

I claim:

1. A display package for fruits and vegetables, comprising:
    (a) a container suitable for reuse as a fruit storage container, the container having an open top and a capacity selected to contain a predetermined amount of fruits or vegetables;
    (b) a lid for the container, the container being positioned on top of the lid, the lid being shaped to be capable of releasably sealably enclosing the top of the container, thereby providing an airtight enclosure for storing various food products, once the fruits or vegetables are removed from the container; and
    (c) a sheet of flexible material sized for overwrapping the container and the lid such that edge portions of the sheet overlap underneath the lid, the edge portions being coupled together so as to secure the lid against the container during handling and display, the material having a composition which allows for visual inspection of the fruits or vegetables and escape of gases generated by the fruits or vegetables.

2. The package defined in claim 1, wherein the sheet of material comprises a clear plastic film.

3. The package defined in claim 2, wherein the plastic film is polyvinyl chloride.

4. The package defined in claim 1, wherein the container and the lid are plastic.

5. The package defined in claim 1, wherein the container and the lid comprise a commercially available reusable food storage container and lid suitable for storing leftovers and other food products.

6. The package defined in claim 2, wherein the overlapping edge portions of the film are heat sealed together.

7. The package defined in claim 1, wherein the container has a peripheral rim with a ridge, and the lid has a peripheral rim with a groove which fits over the ridge so as to form an airtight enclosure when the lid is placed on the container.

8. A display package for fruits or vegetables, comprising a reusable food storage container placed on top of a lid for the container, and a sheet of transparent, flexible, material overwrapping and securing together the container and the lid, wherein the sheet of material comprises a gas permeable film which allows for escape of gases generated by the fruits or vegetables, wherein once the sheet is removed, the container and the lid may be used together to form an airtight enclosure for storing various food products, wherein the sheet comprises a clear plastic material which allows for visual inspection of the fruits or vegetables, and wherein the film has edge portions which overlap underneath the lid, and the edge portions are heat sealed together.

9. The package defined in claim 8, wherein the container and the lid comprise a commercially available reusable plastic food storage container and lid.

* * * * *